(12) United States Patent
Fournier et al.

(10) Patent No.: US 9,668,514 B2
(45) Date of Patent: Jun. 6, 2017

(54) SYNTHESIS AND INCORPORATION OF HIGH-TEMPERATURE AMMONIA-RELEASE AGENT IN LIT-END CIGARETTES

(71) Applicant: Philip Morris USA Inc., Richmond, VA (US)

(72) Inventors: Jay A Fournier, Richmond, VA (US); John B. Paine, Midlothian, VA (US); Douglas A. Fernandez, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 8 days.

(21) Appl. No.: 14/592,375

(22) Filed: Jan. 8, 2015

(65) Prior Publication Data
US 2015/0122280 A1    May 7, 2015

Related U.S. Application Data

(60) Division of application No. 13/356,246, filed on Jan. 23, 2012, now Pat. No. 8,950,409, which is a division
(Continued)

(51) Int. Cl.
*A24B 3/14* (2006.01)
*A24B 15/28* (2006.01)
(Continued)

(52) U.S. Cl.
CPC ............ *A24B 15/282* (2013.01); *A24B 15/28* (2013.01); *A24B 15/287* (2013.01); *A24B 15/30* (2013.01);
(Continued)

(58) Field of Classification Search
None
See application file for complete search history.

(56) References Cited

U.S. PATENT DOCUMENTS

| 3,414,374 A | 12/1968 | Stossel |
| 3,528,432 A | 9/1970 | Stossel |

(Continued)

OTHER PUBLICATIONS

International Search Report and Written Opinion issued Mar. 29, 2006 for PCT/IB2005/003577.
(Continued)

*Primary Examiner* — Phu Nguyen
(74) *Attorney, Agent, or Firm* — Buchanan Ingersoll & Rooney PC (57) ABSTRACT

A tobacco smoking mixture and/or a cigarette wrapper with high-temperature ammonia-release agents therein are provided, wherein the high-temperature ammonia-release agents are present in an amount effective to reduce the cytotoxicity of gas phase or particulate matter formed during smoking of the cigarette. The high-temperature ammonia-release agents are capable of reducing the cytotoxicity of gas phase or particulate matter by evolving ammonia at temperatures greater than about 200° C., wherein the ammonia can interact with the particulate matter. Additionally, the high-temperature ammonia-release agents can be formed by heating an aqueous mixture of an iron precursor compound, an ammonia source compound and an acid.

14 Claims, 3 Drawing Sheets

Related U.S. Application Data of application No. 12/553,695, filed on Sep. 3, 2009, now Pat. No. 8,113,216, which is a continuation of application No. 11/254,858, filed on Oct. 21, 2005, now Pat. No. 7,690,387.

(60) Provisional application No. 60/621,540, filed on Oct. 25, 2004.

(51) Int. Cl.
    *A24B 15/30*    (2006.01)
    *A24B 15/42*    (2006.01)
    *A24D 1/02*     (2006.01)
    *A24D 1/00*     (2006.01)
    *C01B 25/45*    (2006.01)

(52) U.S. Cl.
    CPC .............. *A24B 15/42* (2013.01); *A24D 1/002* (2013.01); *A24D 1/02* (2013.01); *C01B 25/451* (2013.01)

(56) References Cited

U.S. PATENT DOCUMENTS

| | | | |
|---|---|---|---|
| 3,924,642 A * | 12/1975 | Eicher et al. | ............ 131/359 |
| 4,274,427 A | 6/1981 | Lendvay | |
| 4,296,762 A | 10/1981 | Eicher et al. | |
| 5,178,167 A | 1/1993 | Riggs et al. | |
| 5,247,947 A | 9/1993 | Clearman et al. | |
| 5,318,050 A | 6/1994 | Gonzalez-Parra et al. | |
| 5,372,847 A | 12/1994 | Silver et al. | |
| 5,724,998 A | 3/1998 | Gellatly et al. | |
| 5,727,571 A | 3/1998 | Meiring et al. | |
| 6,289,898 B1 | 9/2001 | Fournier et al. | |
| 6,440,223 B1 | 8/2002 | Dube et al. | |
| 6,615,840 B1 | 9/2003 | Fournier et al. | |
| 6,701,936 B2 | 3/2004 | Shafer et al. | |
| 6,868,855 B2 | 3/2005 | Shafer et al. | |
| 6,874,508 B2 | 4/2005 | Shafer et al. | |
| 7,690,387 B2 | 4/2010 | Fournier et al. | |
| 8,113,216 B2 | 2/2012 | Fournier et al. | |
| 8,950,409 B2 | 2/2015 | Fournier et al. | |
| 2005/0051185 A1* | 3/2005 | Rasouli et al. | ............ 131/365 |

OTHER PUBLICATIONS

International Preliminary Report on Patentability issued May 1, 2007 for PCT/IB2005/003577.

Boudin, Sophie et al., "Ammonium Iron(II,III) Phosphate: Hydrothermal Synthesis and Characterization of $NH_4Fe_2(PO_4)_2$", Inorg. Chem., vol. 37, 1998, pp. 799-803.

* cited by examiner

SYNTHESIS AND INCORPORATION OF HIGH-TEMPERATURE AMMONIA-RELEASE AGENT IN LIT-END CIGARETTES

CROSS-REFERENCE TO RELATED APPLICATIONS

This application is a divisional application of U.S. patent application Ser. No. 13/356,246 entitled SYNTHESIS AND INCORPORATION OF HIGH-TEMPERATURE AMMONIA-RELEASE AGENTS IN LIT-END CIGARETTES, filed Jan. 23, 2012 which is a divisional application of U.S. patent application Ser. No. 12/553,695, filed Sep. 3, 2009 (now U.S. Pat. No. 8,113,216) which is a continuation of U.S. patent application Ser. No. 11/254,858, filed Oct. 21, 2005 (now U.S. Pat. No. 7,690,387), which claims priority under 35 U.S.C. 119(e) to U.S. Provisional Application No. 60/621,540, filed on Oct. 25, 2004, the entire content of each is hereby incorporated by reference.

SUMMARY

As provided herein, high-temperature ammonia-release agents are provided for use in smoking articles, such as cigarettes. By providing high-temperature ammonia-release agent, ammonia can be released during combustion or pyrolysis of tobacco and thus ammonia can be available to react with smoke constituents formed during the combustion or pyrolysis of the tobacco or otherwise favorably influence the pyrolysis chemistry.

In an exemplary embodiment, a tobacco smoking mixture comprises tobacco; and at least one high-temperature ammonia-release agent, wherein the at least one high-temperature ammonia-release agent is selected from the group consisting of an ammonium iron phosphate, an ammonium iron pyrophosphate, an ammonium aluminum phosphate, a metal ammine complex, hydrates and mixtures thereof.

In another exemplary embodiment, a cigarette wrapper comprises a web; an optional web-filler material; and at least one high-temperature ammonia-release agent supported on at least one of the web and the web-filler material, wherein the at least one high-temperature ammonia-release agent is selected from the group consisting of an ammonium iron phosphate, an ammonium iron pyrophosphate, an ammonium aluminum phosphate, a metal ammine complex, hydrates and mixtures thereof.

In a further embodiment, a cigarette comprises a tobacco rod; a cigarette wrapper surrounding the tobacco rod; and at least one high-temperature ammonia-release agent, wherein the at least one high-temperature ammonia-release agent is incorporated in or on at least one of the tobacco rod and the cigarette wrapper, and wherein the at least one high-temperature ammonia-release agent is selected from the group consisting of an ammonium iron phosphate, an ammonium iron pyrophosphate, an ammonium aluminum phosphate, a metal ammine complex, hydrates and mixtures thereof.

Also provided is a method of making a cigarette comprising (i) incorporating at least one high-temperature ammonia-release agent in or on at least one of tobacco cut filler and a cigarette wrapper, wherein the at least one high-temperature ammonia-release agent is selected from the group consisting of an ammonium iron phosphate, an ammonium iron pyrophosphate, an ammonium aluminum phosphate, a metal ammine complex, hydrates and mixtures thereof; (ii) providing the tobacco cut filler to a cigarette making machine to form a tobacco column; (iii) placing the cigarette wrapper around the tobacco column to form a tobacco rod of a cigarette; and (iv) optionally attaching a cigarette filter to the tobacco rod using tipping wrapper or other suitable method.

In a further embodiment, a method of making a high-temperature ammonia-release agent comprises forming an aqueous solution of an iron precursor compound, an ammonia source compound, and orthophosphoric acid; and heating the solution to a temperature sufficient to precipitate the high-temperature ammonia-release agents from the solution, wherein the iron precursor compound is selected from the group consisting of oxidized iron particles, lepidocrocite, phosphosiderite and goethite.

DETAILED DESCRIPTION OF PREFERRED EMBODIMENTS

As provided herein, exemplary high-temperature ammonia-release agents, such as ammonium iron phosphates and pyrophosphates, ammonium aluminum phosphates, metal ammine complexes, hydrates and mixtures thereof, are incorporated into tobacco smoking mixtures and smoking articles to reduce the cytotoxicity of cigarette smoke by releasing ammonia upon smoking of the tobacco smoking mixtures and/or the smoking articles.

Exemplary ammonium iron phosphates and pyrophosphates include ammonium iron hydrogen phosphates, such as ammonium iron (III) bis-hydrogen phosphates and ammonium iron (III) pyrophosphates. Exemplary metal ammine complexes include metal hexammine complexes, such as hexammine cobalt (III) phosphate tetrahydrate, chromium hexammine complexes, such as hexammine chromium (III) phosphate tetrahydrate and ruthenium hexammine complexes, such as hexammine ruthenium phosphate tetrahydrate.

Exemplary lit-end cigarettes can include one or more high-temperature ammonia-release agents in tobacco rods and/or cigarette wrappers of the cigarettes. The high-temperature ammonia-release agent can introduce ammonia into a combustion and/or pyrolysis region(s) of the cigarette in an amount effective to decrease the cytotoxicity of particulate matter formed during smoking (i.e., during combustion and/or pyrolysis of tobacco and/or cigarette wrapper). Mixtures of high-temperature ammonia-release agents can be used.

Cigarette smoke comprises solid and gaseous phases (e.g., tar and gas-phase smoke). Combustion by-products can be produced in the combustion/pyrolysis regions of a cigarette during smoking (e.g., from tobacco combustion) and are typically present in both the solid and gaseous phases of cigarette smoke. For example, peroxy radicals, alkoxy radicals, super-oxides, aldehydes, and the like can be present in the tar or gas phase of the cigarette smoke. The high-temperature ammonia-release agents can introduce ammonia into the combustion and/or pyrolysis zones where combustion by-product compounds can be formed.

High-temperature ammonia-release agents preferably evolve ammonia upon combustion/pyrolysis of a smoking article, such as a cigarette. Release of ammonia occurs when the high-temperature ammonia-release agents encounter elevated temperatures based upon heat from the combustion and/or pyrolysis of tobacco during smoking. The ammonia, which is introduced to and is present in the combustion/pyrolysis regions of the cigarette, can react with cytotoxic compounds and/or precursors thereof in order to decrease the cytotoxicity of gas phase, tar and other particulate matter formed during smoking.

Ammonia that is introduced directly to the combustion/pyrolysis zone of a lit-end cigarette during smoking can decrease the cytotoxicity of various compounds in particulate matter (e.g., tar). Without wishing to be bound by theory, the introduction of ammonia to the combustion and/or pyrolysis zone of a lit-end cigarette during smoking can disrupt the formation processes of various compounds. Additionally, ammonia is a free amine group (i.e., it can form free amino groups), which can react with carbonyl groups via Maillard-type reactions resulting in decreased cytotoxicity of particulate matter. Ammonia can also condense with carbonyl groups, and after double-bond migration, can provide "bound" amine groups for further reaction with other carbonyl-group containing substances.

Preferably, the high-temperature ammonia-release agents have minimal effects on the physical properties of mainstream smoke. For example, the odor, taste and appearance of mainstream smoke in a cigarette containing the high-temperature ammonia-release agent should be substantially identical to the odor, taste and appearance of mainstream smoke in a conventional cigarette.

High-temperature ammonia-release agents can be provided with a low solubility in water so as to be compatible with paper-making processes. For example, a high-temperature ammonia-release agent can be provided which is substantially insoluble in an aqueous dispersion used to make cigarette wrappers.

Additionally, a high-temperature ammonia-release agent that is stable in liquids such as water and alcohols can be incorporated into a tobacco smoking mixture (e.g., tobacco cut filler) via an aqueous or non-aqueous dispersion of the high-temperature ammonia-release agent to provide relatively uniform distribution of the high-temperature ammonia-release agents in a smoking article. The high-temperature ammonia-release agent can be provided in liquid or solid form, wherein when provided in solid form, the high-temperature ammonia-release agents can be finely divided and can comprise particles having an average particle size of less than about 10 microns.

By "incorporated in" is meant that high-temperature ammonia-release agents are dispersed throughout a tobacco smoking mixture and/or within a cigarette wrapper. In exemplary embodiments, high-temperature ammonia-release agents are reasonably uniformly incorporated in a tobacco smoking mixture and/or a cigarette wrapper material during the formation of the tobacco smoking mixture and/or the formation of the cigarette wrapper material, respectively. By "incorporated on" is meant that the high-temperature ammonia-release agent is dispersed on an exposed surface of a support such as tobacco and/or a cigarette wrapper material. Particles of a high-temperature ammonia-release agent that are incorporated in or on cut filler or cigarette wrapper can be supported by the cut filler or cigarette wrapper.

In exemplary embodiments, high-temperature ammonia-release agents release ammonia at temperatures greater than about 200° C., more preferably greater than about 600° C. Exemplary high-temperature ammonia-release agents include, as mentioned above, ammonium iron phosphates and pyrophosphates, ammonium aluminum phosphates and metal ammine complexes, each of which can release ammonia at temperatures greater than about 200° C.

In exemplary embodiments, as mentioned above, the high-temperature ammonia-release agent can include ammonium iron phosphates (e.g., phosphates, pyrophosphates, polyphosphates as well as their hydrates), ammonium aluminum phosphates, metal ammine complexes and mixtures thereof. As used herein, the exemplary high-temperature ammonia-release agents are intended include both unhydrated and hydrated species of the compounds used as high-temperature ammonia-release agents.

In exemplary embodiments, ammonium iron bis-hydrogen phosphate ($NH_4Fe(HPO_4)_2$) and/or ammonium iron pyrophosphate ($NH_4FeP_2O_7$) can be used to release ammonia (typically about 6 to 10% by weight). In these exemplary embodiments, the high-temperature ammonia-release agents can release ammonia through their decomposition temperatures greater than about 600° C. The release can occur based upon a disassociation of one or more ammonium cations and the concomitant elimination of their associated phosphoric acid groups. Exemplary ammonium iron (pyro)phosphate phases are listed in Table 1.

TABLE 1

| | Ammonium Iron (Pyro)Phosphates |
|---|---|
| a. | $(NH_4)_9Fe(III)(P_2O_7)_3 \cdot 9H_2O$ |
| b. | $(NH_4)_5Fe(III)(P_2O_7)_2 \cdot 4H_2O$ |
| c. | $(NH_4)_6Fe(II)(P_2O_7)_2 \cdot 6H_2O$ |
| d. | $(NH_4)Fe(III) P_2O_7 \cdot 1.5H_2O$ |
| e. | $(NH_4)_2Fe(II) P_2O_7 \cdot 2H_2O$ |
| f. | $(NH_4)Fe(III) P_2O_7$ |
| g. | $(NH_4)Fe(III)_3(P_6O_{20}) \cdot 10H_2O$ |
| h. | $(NH_4)Fe(III)(HPO_4)_2$ |
| i. | $(NH_4)Fe(III)(HPO_4)_2 \cdot 0.5H_2O$ |
| j. | $(NH_4)_3Fe(III)(HPO_4)(P_2O_7) \cdot H_2O$ |
| k. | $(NH_4)Fe_2(PO_4)_2(OH) \cdot 2H_2O$ |
| l. | $(NH_4)_2Fe(III)P_2O_7(OH) \cdot 2H_2O$ |

In exemplary embodiments, high-temperature ammonia-release agents can be formed by forming an aqueous solution of one or more ammonia source compounds, one or more iron precursor compounds, and an orthophosphoric acid, and then heating the solution to a temperature sufficient to precipitate high-temperature ammonia-release agents therefrom.

Exemplary ammonia source compounds that can be used to form high-temperature ammonia-release agents include, but are not limited to, ammonium dihydrogen phosphate, diammonium hydrogen phosphate, ammonia gas, ammonium carbonate, ammonium bicarbonate, ammonium hydroxide and urea.

Exemplary iron precursor compounds that can be used to form high-temperature ammonia-release agents include, but are not limited to, oxidized iron particles, lepidocrocite, phosphosiderite and goethite. Other exemplary iron precursor compounds can be derived from iron metal such as iron metal flakes that are oxidized. It is noted that lepidocrocite can be derived from iron oxide hydroxide (FeOOH) and phosphosiderite is a stable polymorph of iron (III) phosphate dihydrate, $FePO_4 \cdot 2H_2O$. The phosphosiderite can be prepared via reaction between iron oxide hydroxide (FeOOH) and orthophosphoric acid, $H_3PO_4$. For example, iron oxide hydroxide can be boiled in an aqueous solution of orthophosphoric acid and the resulting precipitate can be filtered, washed with water, and dried at low temperature (e.g., about room temperature) to give the phosphosiderite phase. Details and results from the synthesis of phosphosiderite from iron oxide hydroxide are shown in Table 2. The yield of phosphosiderite was in excess of 90%.

TABLE 2

Synthesis of phosphosiderite, $FePO_4 \cdot H_2O$

| Run | FeOOH (g) | $H_3PO_4$ (g) | Water (mL) | Reflux time (min) | Yield (%) |
|---|---|---|---|---|---|
| 1 | 30 | 127 | 254 | 60 | 96 |
| 2 | 195 | 520 | 500 | 80 | 93 |

After forming iron precursor compounds, such as phosphosiderite, and providing the one or more ammonia source compounds and the orthophosphoric acid, high-temperature ammonia-release agents can be formed therefrom. In exemplary embodiments, high-temperature ammonia-release agents can be synthesized hydrothermally or under atmospheric pressure.

For example, an iron precursor (e.g., phosphosiderite) can first be combined in a Teflon-lined reactor cell with an acidic aqueous solution (of orthophosphoric acid, $H_3PO_4$), and an ammonia source compound (e.g., ammonium dihydrogen phosphate, $NH_4H_2PO_4$). Then, in an open (i.e., un-pressurized vessel) at about 100° C., by stirring the iron precursor (phosphosiderite) into a boiling aqueous solution with ammonium dihydrogen phosphate and an excess of orthophosphoric acid, a high-temperature ammonia-release agent (e.g., ammonium iron (III) bis-hydrogen phosphate hydrate) can be precipitated therefrom. The formation of ammonium iron (III) bis-hydrogen phosphate hydrate from phosphosiderite is shown in Equation 2, where x can be 0.0 or 0.5.

$$FePO_4 \cdot 2H_2O + NH_4H_2PO_4 \rightarrow NH_4Fe(HPO_4)_2 \cdot xH_2O + (2-x)H_2O \qquad \text{Eqn. 2}$$

After filtering, washing and drying the precipitate, a free-flowing, crystalline high-temperature ammonia-release powder can be achieved. Details of the above exemplary synthesis are shown in Table 3. It is noted that from this exemplary synthesis, a yield of greater than 95% ammonium iron (III) bis-hydrogen phosphate hydrate was achieved.

TABLE 3

| Run | $FePO_4 \cdot 2H_2O$ (g) | $NH_4H_2PO_4$ (g) | $H_3PO_4$ (g) | $H_2O$ (mL) | Reflux time (min) | Yield (%) |
|---|---|---|---|---|---|---|
| 1 | 37 | 47 | 58 | 250 | 255 | 97 |
| 2* | 37 | 47 | 58 | 250 | 270 | 96 |

*Run #2 was refluxed while stirring at 120 rpm, while Run #1 was not stirred.

Alternatively, a high-temperature ammonia-release agent can be prepared via a "one pot" synthesis. For example, first, an aqueous solution of iron oxide hydroxide (FeOOH) and orthophosphoric acid can be heated to form phosphosiderite, wherein, preferably, an excess of acid is used. After precipitation of a phosphosiderite intermediate, ammonium dihydrogen phosphate can be added to precipitate an ammonium iron salt and form ammonium iron (III) bis-hydrogen phosphate hydrate using the "one pot" synthesis is shown by Equation 3.

$$FeOOH + H_3PO_4 + NH_4H_2PO_4 \rightarrow NH_4Fe(HPO_4)_2 \cdot xH_2O + (2-x)H_2O \qquad \text{Eqn. 3}$$

By way of example, approximately 117 grams of FeOOH was combined with a first solution of 85% $H_3PO_4$ (1130 grams) and about 460 grams of $NH_4H_2PO_4$ in 2 liters of water to form a second solution. Next, the second solution can be refluxed for about 3 hours under constant stirring at about 170 rpm, wherein a precipitate yield of nearly 100% can be obtained after filtering, washing and drying.

In another exemplary "one pot" synthesis method, iron oxide hydroxide precursor (e.g., Bayferrox® 943 from Bayer AG, Germany) can be used as the iron precursor material. Initially, approximately 45 grams of the iron oxide hydroxide can be combined with 86% $H_3PO_4$ (177 grams) in 400 mL of boiling water under constant stirring. After about 60 minutes, about 115 grams of $NH_4H_2PO_4$ was added under continued reflux and continued stirring. Approximately 100% yield of a high-temperature ammonia-release agent ammonium iron salt can be obtained after filtering, washing and drying precipitate.

In another exemplary embodiment Ammonium iron (III) pyrophosphate, $(NH_4)Fe(III)P_2O_7$, can be synthesized by hydrothermally treating phosphosiderite under more vigorous conditions (e.g., by increasing the temperature, pressure and reflux time) compared to those used to form the phosphate according to Equation 2 above. In an embodiment, a static (i.e., without stirring) hydrothermal synthesis of the pyrophosphate phase can be carried out in a Teflon-lined stainless steel vessel. Alternatively, stirring during the synthesis can be provided to improve the yield of free-flowing powder (as opposed to an agglomerate). It is noted that exemplary high-temperature ammonia-release agents were synthesized, wherein maximum external temperatures and internal pressures in exemplary vessels are reported in Table 4.

TABLE 4

| | Run 1 | Run 2 | Run 3 | Run 4 | Run 5 | Run 6 |
|---|---|---|---|---|---|---|
| $FePO_4 \cdot 2H_2O$ (g) | 19 | 19 | 19 | 19 | 38 | 75 |
| $NH_4H_2PO_4$ (g) | 23 | 46 | 115 | 60 | 57 | 69 |
| $(NH_4)_2HPO_4$ (g) | 0 | 0 | 0 | 66 | 0 | 0 |
| $H_3PO_4$ (g) | 45 | 93 | 0 | 0 | 92 | 92 |
| $H_2O$ (mL) | 90 | 50 | 100 | 100 | 50 | 50 |
| Time (hr) | ~25 | ~72 | ~48 | 72 | 93 | 120 |
| $T_{max}$ (external) (° C.) | 280 | 315 | 318 | 315 | 315 | 315 |
| $P_{max}$ (psig) | 320 | 370 | 570 | 650 | 500 | 400 |
| Yield (g) | 25 | 23 | 22 | 20 | 46 | 100 |
| Product | Phos | Pyro | Phos + Pyro | Pyro + Hydphos | Pyro | Pyro |

Identification of the crystalline phases present in the product was done using x ray diffraction. Referring to Table 4, the product "Phos" is intended to indicate ammonium iron (III) bis-hydrogen phosphate, "Pyro" is intended to indicate ammonium iron (III) pyrophosphate and "Hydphos" is intended to indicate ammonium iron (III) hydroxide phosphate dihydrate, $(NH_4)Fe_2(PO_4)_2(OH)\cdot 2H_2O$.

The product from Run #1, which shows the result of an experiment carried out at the lowest temperature, pressure and time of the six exemplary embodiments shown, is ammonium iron (III) bis-hydrogen phosphate hydrate. At the highest reactor temperature (i.e., greater than about 300° C.) and a maximum internal pressure (i.e., greater than about 350 psig) (i.e., Run #2) of the six exemplary embodiments shown, the product from is ammonium iron (III) pyrophosphate. In the product from Run #3 both the phosphate and pyrophosphate phases were detected. In the product from Run #4 pyrophosphate phase and an ammonium iron hydroxide phosphate phase were detected.

Other exemplary high-temperature ammonia-release agents include hexammine complexes of various transition metals. Ammine complexes, which may coordinate up to 6 ammonia molecules per transition metal ion (e.g., cobalt, chromium or ruthenium) can release up to about 30% ammonia or more by weight. Heating ammine complexes can initially cause dehydration at about 100° C., however, heating to temperatures exceeding about 100° C. can cause decomposition, which can result in a decrease in the oxidation state of the transition metal center (i.e., the metal can be reduced). The decomposition of ammine complexes can be represented by Equation 1, which shows the release of ammonia, water and nitrogen from a hexammine complex (e.g., hexamminecobalt (III) phosphate $Co(NH_3)_6PO_4$ at about 230° C.).

$$6Co(NH_3)_6PO_4 \rightarrow 3Co_2P_2O_7 + 34NH_3 + 3H_2O + N_2 \quad \text{Eqn. 1}$$

The thermal decomposition of hexammine cobalt (III) phosphate tetrahydrate to form ammonia is disclosed in Gmelin's Handbuch der Anorganischen Chemie, 8, Auflage, Kobalt, Teil B, page 66, the content of which is incorporated herein by reference.

Hexammine complexes can be prepared via reaction between a hexammine metal chloride and a water soluble phosphate. For example, crystals of hexammine cobalt (III) phosphate tetrahydrate can be obtained by filtering, washing and drying the precipitate resulting from the addition of diammonium phosphate to an aqueous solution of hexammine cobalt (III) chloride. Optionally, the pH of the solution can be increased by the addition of a base such as ammonia.

By way of example, cobalt chloride hexahydrate (70 g) can be combined with ammonium chloride (34 g) and ammonium hydroxide (190 g) in an aqueous solution (500 mL water). Approximately 30 grams of activated carbon (to catalyze hexamine cobalt (III) formation) can then be added to the solution, which can then be treated with a vigorous stream of air or oxygen at room temperature for about 4 hours. The precipitate can then be filtered, washed with water, and the filtrate treated with an aqueous solution of diammonium hydrogen phosphate, $(NH_4)_2HPO_4$, (24 grams in 150 mL $H_2O$) for about 1 hr to obtain an approximately 25% yield of hexammine cobalt (III) orthophosphate tetrahydrate, $(Co(NH_3)_6)PO_4\cdot 4H_2O$ from the filtrate.

Additionally, the activated carbon/hexammine cobalt (III) trichloride filter cake, as provided above, can be leached with water (760 mL) under air agitation for about 40 minutes, wherein residual activated carbon can subsequently be removed by filtration. From this filtrate, an additional 25% yield of hexammine cobalt (III) orthophosphate tetrahydrate can thus be obtained by adding diammonium hydrogen phosphate (25 g dissolved in minimal water), thus resulting in a total yield that was approximately 50%.

In a further example, crystals of hexammine chromium (III) phosphate tetrahydrate can be obtained via the addition of diammonium phosphate to a solution of hexammine chromium (III) chloride. Advantageously, in contrast to the hexammine cobalt (III) phosphate, which can thermally decompose to give ammonia, water and nitrogen according to Equation 1, thermal decomposition of a single mole of the chromium complex can produce six moles of ammonia, without causing oxidation of other molecules.

As provided herein, exemplary tobacco smoking mixtures include at least about 50% by weight of tobacco (and thus, an effective amount of high-temperature ammonia-release agents of up to about 50%) based on the total weight of the tobacco smoking mixture. The tobacco typically functions as fuel in the combustion and/or pyrolysis of the tobacco smoking mixture. Examples of suitable types of tobacco include flue-cured, Bright, Burley, Md. or Oriental tobaccos, the rare or specialty tobaccos, and blends thereof. The tobacco can be provided in the form of cut tobacco leaf filler, processed tobacco materials such as volume expanded or puffed tobacco, processed tobacco stems such as cut-rolled or cut-puffed stems, reconstituted tobacco materials or blends thereof. The tobacco can also include tobacco substitutes such as synthetic tobacco. Generally the tobacco used to form a cigarette is aged.

In cigarette manufacture, the tobacco can be employed in the form of cut filler, i.e., in the form of shreds or strands cut into widths ranging from about ⅒ inch to about 1/20 inch or even 1/40 inch. The lengths of the strands range from between about 0.25 inch to about 3.0 inch.

The tobacco smoking mixture may optionally include additives to improve various characteristics of the tobacco during smoking. For example, taste modifiers may be added to the tobacco smoking mixture to improve its flavor. In addition, burn additives may be used to impart desirable burn characteristics to the tobacco. Examples of burn additives include, but are not limited to, sodium fumarate, sodium citrate, potassium citrate, potassium succinate, potassium monohydrogen phosphate, and potassium dihydrogen phosphate.

The tobacco smoking mixture may be manufactured using any suitable technique. The high-temperature ammonia-release agent may be added to tobacco cut filler, which in turn can be supplied to a cigarette-making machine, or the high-temperature ammonia-release agent can be incorporated on a pre-formed tobacco column prior to wrapping a cigarette wrapper around the tobacco column. For example, according to one embodiment, a method for manufacturing the tobacco smoking mixture comprises the step of spraying tobacco with at least one high-temperature ammonia-release agent in liquid or solid form.

To facilitate spraying of solid high-temperature ammonia-release agents, the agent can be added to a liquid carrier to form a slurry or a solution, and the slurry or solution can be sprayed onto the tobacco. The tobacco smoking mixture containing high-temperature ammonia-release agents can then be processed for use in a cigarette (or other smoking article).

Slurry or solution with high-temperature ammonia-release agents therein can include any non-reactive liquid or liquid mixture suitable for dispersing and dispensing (e.g., spraying) high-temperature ammonia-release agents. A preferred liquid is water (e.g., deionized water), though other liquids, such as alcohols, can be used. The concentration of high-temperature ammonia-release agents in the slurry or solution can be any amount suitable for dispensing the slurry or solution onto tobacco. Slurry or solution of high-temperature ammonia-release agents in a liquid can comprise greater than about 1%, more preferably greater than about 5% by weight of the high-temperature ammonia-release agents.

Alternatively, solid high-temperature ammonia-release agents can be provided as powder or particulate matter and can be mixed with the tobacco to form a tobacco smoking mixture before processing the tobacco smoking mixture for use in a cigarette (or other smoking article). For example, moistened tobacco cut filler or a slurry of reconstituted tobacco material can be dusted with a powdered high-temperature ammonia-release agent prior to forming the tobacco material into a tobacco rod.

Another technique for incorporating particles of a high-temperature ammonia-release agent in a tobacco smoking mixture involves adding the high-temperature ammonia-release agent to a slurry of ingredients used to make reconstituted tobacco. Particles of high-temperature ammonia-release agent can be added to the in any suitable amount, then the high-temperature ammonia-release agent containing reconstituted tobacco slurry can be formed into reconstituted tobacco sheet and cut to size for incorporation as 100% filler of a tobacco rod or the can be added to tobacco rod filler material and the mixture formed into a tobacco rod.

Preferably, a total amount of high-temperature ammonia-release agent in the tobacco smoking mixture is an amount effective to reduce the cytotoxicity of tar and other particulate matter generated from the combustion/pyrolysis of tobacco and/or cigarette wrapper. The tobacco smoking mixture can comprise up to about 10% by weight or more of a high-temperature ammonia-release agent, based on the total weight of the mixture. A cigarette can be formed from a tobacco column comprising the tobacco smoking mixture.

According to a further embodiment, a high-temperature ammonia-release agent is incorporated in and/or on a cigarette wrapper. Preferably, the cigarette wrapper is used to form a lit-end cigarette. A high-temperature ammonia-release agent can be incorporated in or on the wrapper of a lit-end cigarette in addition to and/or in lieu of incorporation of the high-temperature ammonia-release agent in the tobacco smoking mixture. By incorporating the high-temperature ammonia-release agent in the cigarette wrapper, the high-temperature ammonia-release agent can evolve ammonia upon combustion/pyrolysis of the cigarette. The ammonia formed by the high-temperature ammonia-release agent can decrease the cytotoxicity of gas phase, tars and other particulate matter formed in the combustion/pyrolysis regions of the cigarette during smoking.

Figures 1A, 1B:
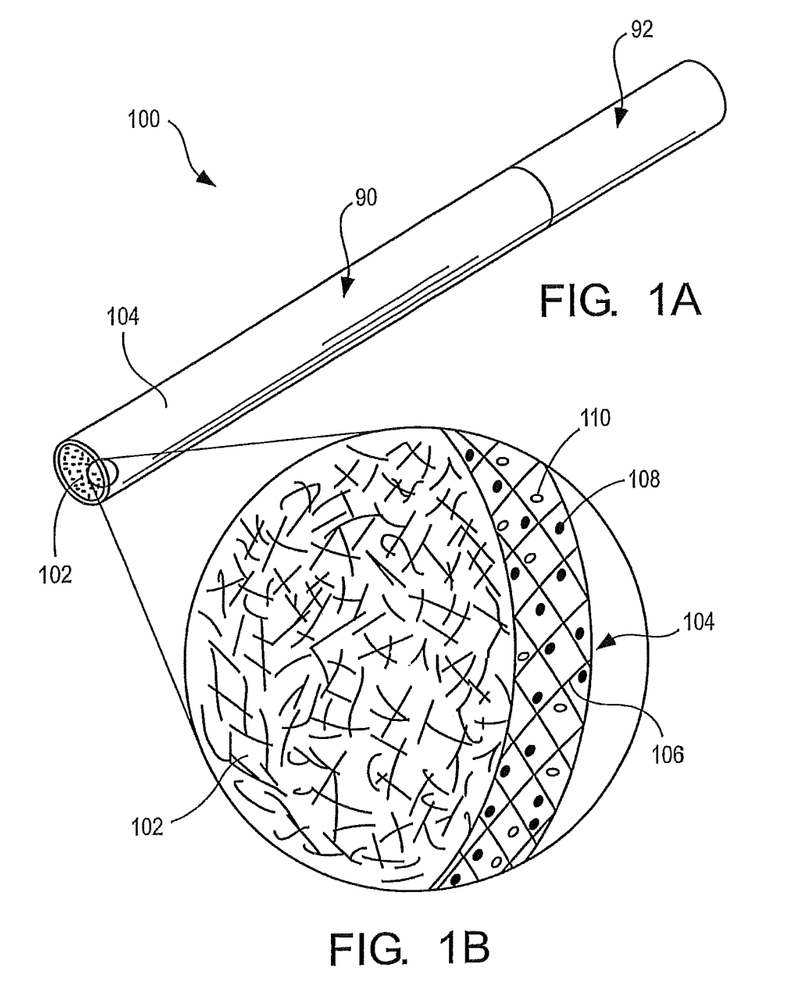
FIG. 1(a) shows an exemplary cigarette with a high-temperature ammonia-release agent supported on the base web of the wrapper.
FIG. 1(b) shows a magnified view of a portion of the exemplary cigarette from FIG. 1(a).

Referring to FIG. 1(a), an exemplary embodiment cigarette 100 has a tobacco rod portion 90, an optional filtering tip 92 and a cigarette wrapper 104 which can include high-temperature ammonia-release agents therein or thereon. Also, as shown in FIG. 1(a), the tobacco rod portion 90 includes a column of tobacco 102 that is enwrapped with the cigarette wrapper 104.

The high-temperature ammonia-release agent 110 can be incorporated directly into a cigarette wrapper (e.g., in place of a web-filler material) or the high-temperature ammonia-release agent can be incorporated into the cigarette wrapper by supporting the high-temperature ammonia-release agent on the web-filler material. The web-filler material can include an oxide, a carbonate, or a hydroxide of a Group II, Group III or Group IV metal, or the web-filler material can be selected from the group consisting of $CaCO_3$, $TiO_2$, silicates such as $SiO_2$, $Al_2O_3$, $MgCO_3$, MgO, $Mg(OH)_2$ and hydromagnesite.

As shown in expanded view in FIG. 1(b), the cigarette wrapper 104 includes a web of fibrous cellulosic material 106 in which is typically dispersed particles of a web-filler material 108, such as calcium carbonate ($CaCO_3$). In practice, the web-filler material 108 serves as an agent for controlling the permeability of the wrapper 104 (measured typically in units of Coresta, which is defined as the volume of air, measured in cubic centimeters, that passes through one square centimeter of material in one minute at a pressure drop of 1.0 kilopascals) and optionally serves as a support for particles of a high-temperature ammonia-release agent 110.

In a preferred embodiment of a cigarette wrapper comprising a high-temperature ammonia-release agent, the high-temperature ammonia-release agent is an ammonium iron phosphate optionally supported on particles of a calcium carbonate web-filler material. In another preferred embodiment, a total amount of high-temperature ammonia-release agent in the cigarette wrapper is an amount effective to reduce the cytotoxicity of tar and other particulate matter generated from the combustion/pyrolysis of tobacco and/or cigarette wrapper during smoking.

In one approach, a high-temperature ammonia-release agent 110, such as ammonium iron phosphate, is supported by web-filler material 108, such as $CaCO_3$, by forming an aqueous slurry of the high-temperature ammonia-release agent and the web-filler material. The $CaCO_3$ can be the same as the filler material used in the papermaking process, such as ALBACAR 5970 commercially available from Specialty Minerals of Bethlehem, Pa. The slurry is spread, for example, using a doctor's blade, and then dried to evaporate the water. The slurry can be dried by exposure to air and optionally a heat source, such as radiation lamp at 75° C., although other methods such as vacuum filtering followed by drying can also be used to dry the slurry. The wet or dried slurry can include a high-temperature ammonia-release agent modified web-filler, which can be incorporated in a cigarette wrapper.

A high-temperature ammonia-release agent modified web-filler can be incorporated in the wrapper through conventional papermaking processes. For example, the high-temperature ammonia-release agent modified web-filler can be used as all or part of the filler material in the papermaking processes or can be distributed directly onto the wrapper, such as by spraying or coating onto a wet or dry base web. Alternatively, a high-temperature ammonia-release agent can be incorporated in a wrapper as filler material (i.e., in lieu of a conventional filler material such as calcium carbonate).

A wrapper can be any wrapping adapted to surround the cut filler, including wrappers containing flax, hemp, kenaf, esparto grass, rice straw, wood pulp, cellulose and so forth. When supplied to the cigarette-making machine, the wrapper can be supplied from a single bobbin in a continuous sheet (a mono-wrap) or from multiple bobbins (a multi-wrap, such as a dual wrap from two bobbins). Further, the wrapper can have more than one layer in cross-section, such as in a bi-layer paper as disclosed in commonly-owned U.S. Pat. No. 5,143,098, the entire content of which is herein incorporated by reference. The high-temperature ammonia-release agent 110 can be provided in the cigarette wrapper in addition to or in lieu of web-filler material 108.

Alternatively, the cigarette wrapper can include at least one high-temperature ammonia-release agent on the cigarette wrapper 104 supported directly on the cigarette wrapper. For example, high-temperature ammonia-release agents can be sprayed in liquid or particle form onto a surface a cigarette wrapper to form a uniform distribution of the high-temperature ammonia-release agents on the cigarette wrapper.

Further and in the alternative to incorporating a high-temperature ammonia-release agent into the web of the wrapper in a papermaking process, it is contemplated that the paper (wrapper) can be manufactured first and the high-temperature ammonia-release agent can subsequently be incorporated on one or more surfaces of the paper. For example, the high-temperature ammonia-release agent can be distributed directly onto the wrapper, such as by spraying or coating onto wet base web, the intermediate web or the finished web. The high-temperature ammonia-release agent can be coated onto the outer and/or inner surface of a cigarette wrapper, though a wrapper having high-temperature ammonia-release agent incorporated on an inner surface thereof is preferred. The inner surface of a cigarette wrapper is adapted to be closer to the tobacco column than the outer surface of a cigarette wrapper. If desired, a wrapper incorporating a high-temperature ammonia-release agent can be used at other locations and/or for any of the wrapper layers of a cigarette.

When incorporated in or on a cigarette wrapper, a preferred amount of the high-temperature ammonia-release agent is equal to from about 5% to 60%, more preferably about 20% to 50% of the final wrapper weight.

Figures 2A, 2B:
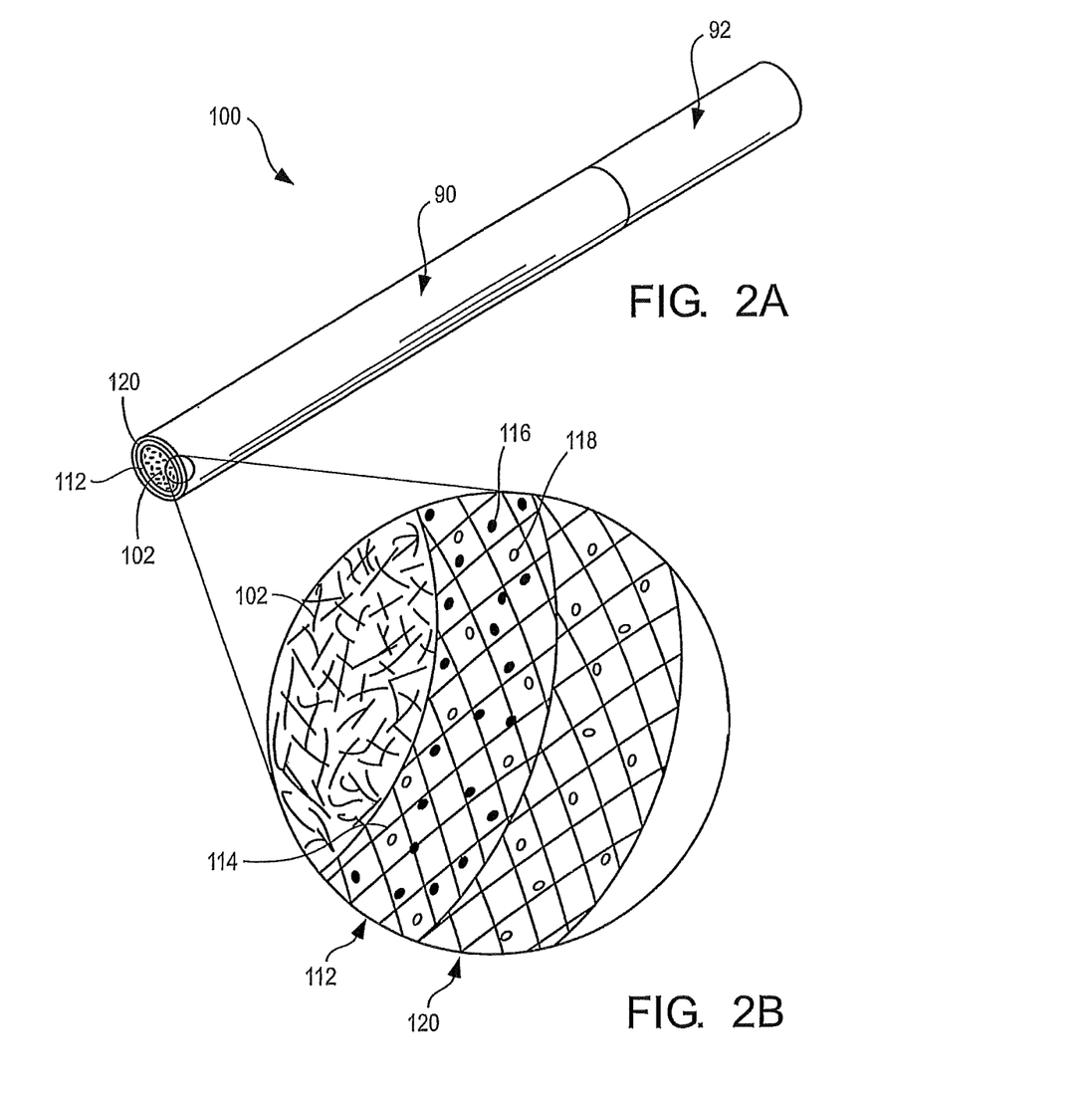
FIG. 2(a) shows an exemplary cigarette with a high-temperature ammonia-release agent supported on the base web of a first wrapper with a second outermost wrapper.
FIG. 2(b) shows a magnified view of a portion of the exemplary cigarette from FIG. 2(a).

The cigarette wrapper may be a one-wrapper construction, a multi-wrapper construction or a multi-layer single-wrap construction. FIGS. 2(a) and 2(b) show a cigarette with a high-temperature ammonia-release agent supported on the base web of a first wrapper with a second outermost wrapper. In the FIG. 2(a) embodiment, the cigarette 100 includes a cigarette tobacco column 102 surrounded by a first inner wrapper 112. As shown in expanded view in FIG. 2(b), the first wrapper 112 includes a web 114. A web-filler material 116 and a high-temperature ammonia-release agent 118 are supported on the web 114. If desired, the first wrapper 112 can include a high-temperature ammonia-release agent 118 that is supported on particles of web-filler material (not shown).

The cigarette 100 has a second wrapper 120 surrounding the first wrapper 112. The total amount of high-temperature ammonia-release agent 118 in the second outer wrapper 120 is preferably less than 1 mg for a given single cigarette 100, however the second wrapper 120 can also not include any high-temperature ammonia-release agents so as to provide an appearance to the cigarette 100 that is not affected by any coloration from the high-temperature ammonia-release agent.

A total amount of high-temperature ammonia-release agent in the first wrapper can be from about 10 to 100 mg and in the second wrapper can be less than 1 mg, preferably 0 mg and/or a ratio, in weight percent, of high-temperature ammonia-release agent in the second wrapper 120 to the high-temperature ammonia-release agent in the first wrapper 112 can be less than about 0.25.

Referring again to the embodiment of FIGS. 2(a) and 2(b), the inner wrapper and the outer wrapper are individual wrappers formed in separate papermaking processes and later wrapped around tobacco cut filler to form a cigarette tobacco rod. The inner wrapper, the outer wrapper or both wrappers can include a high-temperature ammonia-release agent.

In examples where both wrappers include a high-temperature ammonia-release agent, the specific high-temperature ammonia-release agent and the loading in each wrapper can be the same or different. Because the addition of a high-temperature ammonia-release agent can discolor the wrapper, e.g., the wrapper becomes non-white or brown, for aesthetic reasons an outer wrapper that is a conventional color, e.g., white, can be placed around the inner wrapper. Both the inner wrapper and the outer wrapper can be selected to give a desired cigarette performance with respect to cigarette properties, such as puff count, tar, burn rate, and ash appearance.

Figures 3A, 3B:
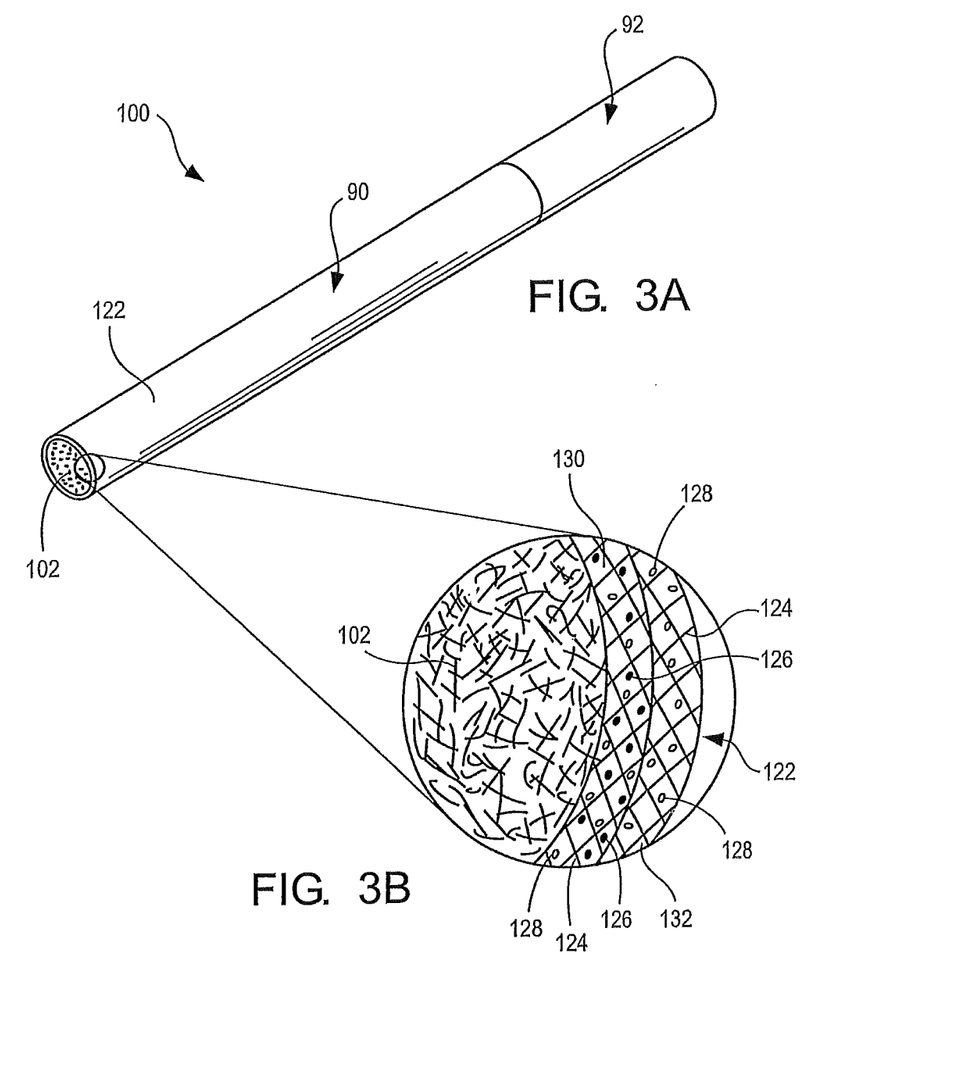
FIG. 3(a) shows an exemplary cigarette with a wrapper including a high-temperature ammonia-release agent. An inner web region of the wrapper contains high-temperature ammonia-release agent.
FIG. 3(b) shows a magnified view of a portion of the exemplary cigarette from FIG. 3(a).

FIG. 3(a) shows an embodiment of a cigarette with a wrapper including a high-temperature ammonia-release agent. In the FIG. 3(a) embodiment, the cigarette 100 includes a cigarette tobacco column 102 and a wrapper 122. As shown in expanded view in FIG. 3(b), the wrapper 122 includes a web 124 and incorporated in the web are a web-filler material 126 and a high-temperature ammonia-release agent 128. The web-filler material 126 and the high-temperature ammonia-release agent 128 are supported on the web. If desired, the high-temperature ammonia-release agent 128 can be supported on the web-filler material, which can be supported on the web. The wrapper 122 has a radially inner portion 130 and a radially outer portion 132, the radially inner portion 130 having a first loading of the high-temperature ammonia-release agent 128 and the radially outer portion 132 having a second loading of the high-temperature ammonia-release agent 128.

In an exemplary cigarette, the first loading of the high-temperature ammonia-release agent can be greater than the second loading of the high-temperature ammonia-release agent. For example, the first loading of the high-temperature ammonia-release agent in the wrapper for a given single cigarette 100 can be up to 100 mg and the second loading of the high-temperature ammonia-release agent can be less than 1 mg. In the FIG. 3(a) embodiment, the high-temperature ammonia-release agent can be distributed throughout the wrapper such that when the wrapper is formed about a tobacco column to form a tobacco rod of a cigarette, the loading of the high-temperature ammonia-release agent decreases in the radial direction. However, the axial loading of the high-temperature ammonia-release agent (e.g., along the length of the tobacco rod) can also be substantially uniform.

The wrapper can be any suitable conventional wrapper. For example, a preferred wrapper can have a basis weight of from about 15 $g/m^2$ to 75 $g/m^2$ and a permeability of from about 2 Coresta units to about 200 Coresta units. More preferably, the wrapper has a basis weight from about 20 $g/m^2$ to 50 $g/m^2$ and the permeability is about 10 to 100 Coresta units. However, any suitable basis weight for the wrapper can be selected. For example, a higher basis weight, e.g., 35 to 45 $g/m^2$, can support a higher loading of high-temperature ammonia-release agent. If a lower loading of a high-temperature ammonia-release agent is selected, then a lower basis weight wrapper can be used.

Other permeabilities of the wrapper (as measured by Coresta units) can be selected based on the application and location of the wrapper. For example, in multi-layer wrappers the permeability of a first layer can be up to 1,000 Coresta units, although a permeability that is lower or higher can be used. Thickness of single-layer wrapper can preferably be from about 15 to 100 microns, more preferably from about 20 to 50 microns. Additional layers in a multi-layer wrapper can be from 0.1 to 10 times the permeability of the first layer and can have a thickness of from 0.1 to 2 times the thickness of the first layer. Both the permeability and the thickness of the first layer and the second layer can be selected to achieve a desired total air permeability and total thickness for the cigarette.

According to still yet another method for incorporating high-temperature ammonia-release agents in a smoking article, the high-temperature ammonia-release agents can be incorporated in either or both of tobacco smoking mixture and/or a cigarette wrapper. Therefore, exemplary embodiments of cigarettes and methods of making cigarettes can include a tobacco rod portion of a cigarette with a high-temperature ammonia-release agent incorporated in the tobacco cut filler and/or in a cigarette wrapper that overwraps the tobacco.

The location, distribution and quantity of high-temperature ammonia-release agent in the wrapper and/or cut filler can, be selected as a function of the temperature and airflow characteristics exhibited in a burning cigarette in order to minimize the cytotoxicity of the generated particulate matter or gas phase while maintaining desired organoleptic properties. For example, the solid coal in a cigarette reaches the peak temperature of greater than 850-900° C. at about the burn zone, e.g., within about 2 mm of the burn zone, and is at 300° C. to 400° C. within 2 to 3 mm of the burn zone. Thus, a high-temperature ammonia-release agent can be selected that operates in a given temperature range, and a tobacco smoking mixture and/or wrapper can be manufactured in which high-temperature ammonia-release agent can be incorporated in order to provide the desired reduction in cytotoxicity of tar and other particulate matter formed during smoking.

Exemplary high-temperature ammonia-release agents can be positioned along the entire axial length of the anticipated burn zone, e.g., not only at the distal end of the cigarette, and can be active from the lit end to the filter end during smoking of the cigarette. The distribution of the high-temperature ammonia-release agent preferably provides sufficient contact time between pre-condensed particulate matter (e.g., tar) and the thermally generated ammonia to substantially decrease the cytotoxicity of the particulate matter.

In a further example, a mixed high-temperature ammonia-release agent, e.g., a combination of two or more high-temperature ammonia-release agent compositions (each of which release ammonia at different temperature ranges) or overlapping temperature ranges can be used to broaden the temperature range at which ammonia is generated. For example, a mixed high-temperature ammonia-release agent may operate to introduce ammonia in both the combustion and pyrolysis regions.

Although the high-temperature ammonia-release agent is described herein as having an operating temperature, the phrase "operating temperature" refers to the preferred temperature for creation of ammonia. The high-temperature ammonia-release agent may still operate to decrease the cytotoxicity of gas phase, tar and other particulates generated via tobacco combustion outside the described temperature range.

In addition, any of the wrappers or methods described herein can include additional additives conventionally used in wrappers for cigarettes. These additives can include, for example, optional filler materials, flavor additives, additives to control the appearance, e.g., color, of the wrapper, additives to control the burn rate of the wrapper, and/or additives to result in a desired ash appearance and/or web-fillers used in cigarette wrapper. Burn additives such as alkali metal salts of carboxylic acids or of phosphoric acids can be applied to the wrapper to adjust or control the burn rate of a cigarette comprising the wrapper. For example, burn additives can be applied in amounts ranging from about 2% to about 15% by weight of the wrapper.

An embodiment relates to a method of making a cigarette comprising the steps of (i) incorporating a high-temperature ammonia-release agent in at least one of tobacco cut filler and a cigarette wrapper; (ii) providing the tobacco cut filler to a cigarette making machine to form a tobacco column; (iii) placing the cigarette wrapper around the tobacco column to form a tobacco rod of a cigarette; and (iv) optionally attaching a cigarette filter to the tobacco rod using tipping wrapper. In cigarette production, a wrapper is wrapped around cut filler to form a tobacco rod portion of the cigarette by a cigarette-making machine, which has previously been supplied or is continuously supplied with tobacco cut filler and one or more ribbons of wrapper.

According to preferred methods, a high-temperature ammonia-release agent is incorporated in tobacco cut filler and/or a cigarette wrapper that are used to form a lit-end cigarette. By incorporating a high-temperature ammonia-release agent into one or more components of a cigarette, the high-temperature ammonia-release agent can decrease the cytotoxicity of particulate matter in mainstream smoke during smoking of the cigarette.

Preferably, the high-temperature ammonia-release agent is incorporated in tobacco cut filler and/or a cigarette wrapper in an amount effective to decrease the cytotoxicity of particulate matter in mainstream smoke by at least 5% (e.g., by at least 15%, 20%, 25%, 30%, 35%, 40%, 45%, 50%, 55%, 60%, 65%, 70%, 75%, 80%, 85%, 90% or 95%) compared to a cigarette without the high-temperature ammonia-release agent. A preferred amount of the high-temperature ammonia-release agent per cigarette is about 100 microgram to 100 mg.

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing smoke from the combustion through the mouth end of the cigarette.

The term "mainstream" smoke refers to the mixture of gases passing down the tobacco rod and issuing through the filter end, i.e., the amount of smoke issuing or drawn from the mouth end of a cigarette during smoking of the cigarette. The mainstream smoke contains smoke that is drawn in through both the lighted region, as well as through the cigarette wrapper. The term "sidestream" includes smoke given off into the surrounding air that does not exit through the mouth end of the cigarette.

During smoking there are three distinct regions in a cigarette: the combustion zone, the pyrolysis/distillation zone, and the condensation/filtration zone. First, the combustion zone is the burning zone of the cigarette produced during smoking of the cigarette at the lighted end of the cigarette. The temperature in the combustion zone ranges from about 600° C. to about 950° C., and the heating rate can be as high as 500° C./second. The pyrolysis zone is the region behind the combustion zone, where the temperature ranges from about 200° C. to about 600° C. Finally, in the condensation/filtration zone the temperature ranges from ambient to about 150° C.

Any conventional or modified cigarette making technique may be used to incorporate one or more high-temperature ammonia-release agents into a cigarette. The cigarettes can be manufactured to any known specifications using standard or modified cigarette making techniques and equipment. The cut filler composition, for example, is optionally combined with other cigarette additives, and provided to a cigarette-making machine to produce a tobacco column, which is then wrapped in cigarette wrapper, and optionally tipped with filters.

Cigarettes may range from about 50 mm to about 120 mm in length. The circumference is from about 15 mm to about 30 mm in circumference, and preferably around 25 mm. The tobacco packing density is typically between the range of about 100 mg/cm$^3$ to about 300 mg/cm$^3$, and preferably 150 mg/cm$^3$ to about 275 mg/cm$^3$.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

All of the above-mentioned references are herein incorporated by reference in their entirety to the same extent as if each individual reference was specifically and individually indicated to be incorporated herein by reference in its entirety.

What is claimed is:

1. A cigarette wrapper, comprising:
   a web;
   an optional web-filler material; and
   at least one high-temperature ammonia-release agent supported on at least one of the web and the web-filler material, wherein the at least one high-temperature ammonia-release agent is selected from the group consisting of an ammonium iron pyrophosphate comprising ammonium iron (III) pyrophosphate, a metal ammine complex, hydrates and mixtures thereof.

2. The cigarette wrapper of claim 1, wherein the at least one high-temperature ammonia-release agent comprises a metal ammine complex, and wherein the metal ammine complex comprises hexammine cobalt (III) phosphate tetrahydrate, hexammine chromium (III) phosphate tetrahydrate, hexammine ruthenium phosphate tetrahydrate or a mixture thereof.

3. The cigarette wrapper of claim 1, wherein the at least one high-temperature ammonia-release agent comprises from about 5 to 60% by weight of the final weight of the cigarette wrapper.

4. The cigarette wrapper of claim 1, wherein the at least one high-temperature ammonia-release agent produces ammonia at a temperature of greater than about 200° C.

5. The cigarette wrapper of claim 1, wherein the areal distribution of the at least one high-temperature ammonia-release agent is substantially uniform.

6. The cigarette wrapper of claim 1, wherein the at least one high-temperature ammonia-release agent is present in an amount effective to reduce the cytotoxicity of particulate matter upon the combustion and/or pyrolysis of the cigarette wrapper.

7. A cigarette wrapper, comprising:
   a web;
   a web-filler material; and
   at least one high-temperature ammonia-release agent supported on the web-filler material, wherein the at least one high-temperature ammonia-release agent is selected from the group consisting of an ammonium iron phosphate comprising an ammonium iron hydrogen phosphate, an ammonium iron pyrophosphate, an ammonium aluminum phosphate, a metal ammine complex, hydrates and mixtures thereof.

8. A cigarette wrapper, comprising:
   a sheet of cigarette paper;
   at least one high-temperature ammonia-release agent supported on the sheet of cigarette paper, wherein the at least one high-temperature ammonia-release agent is selected from the group consisting of an ammonium iron pyrophosphate comprising ammonium iron (III) pyrophosphate, a metal ammine complex, hydrates and mixtures thereof.

9. The cigarette wrapper of claim 8, wherein the at least one high-temperature ammonia-release agent comprises a metal ammine complex, and wherein the metal ammine complex comprises hexammine cobalt (III) phosphate tetrahydrate, hexammine chromium (III) phosphate tetrahydrate, hexammine ruthenium phosphate tetrahydrate or a mixture thereof.

10. The cigarette wrapper of claim 8, wherein the at least one high-temperature ammonia-release agent comprises from about 5 to 60% by weight of the final weight of the cigarette wrapper.

11. The cigarette wrapper of claim 8, wherein the at least one high-temperature ammonia-release agent produces ammonia at a temperature of greater than about 200° C.

12. The cigarette wrapper of claim 8, wherein the areal distribution of the at least one high-temperature ammonia-release agent is substantially uniform.

13. The cigarette wrapper of claim 8, wherein the at least one high-temperature ammonia-release agent is present in an amount effective to reduce the cytotoxicity of particulate matter upon the combustion and/or pyrolysis of the cigarette wrapper.

14. A cigarette wrapper, comprising:
   a sheet of cigarette paper;
   at least one high-temperature ammonia-release agent supported on the sheet of cigarette paper, wherein the at least one high-temperature ammonia-release agent is selected from the group consisting of an ammonium iron phosphate comprising an ammonium iron hydrogen phosphate, an ammonium iron pyrophosphate, an ammonium aluminum phosphate, a metal ammine complex, hydrates and mixtures thereof.

* * * * *